US006379600B1

(12) United States Patent
Sanders

(10) Patent No.: US 6,379,600 B1
(45) Date of Patent: Apr. 30, 2002

(54) METHOD FOR INJECTION MOLDING A TROUGH

(76) Inventor: Daniel G. Sanders, 2024 Ferry Rd., Grand Island, NY (US) 14072

(*) Notice: Subject to any disclaimer, the term of this patent is extended or adjusted under 35 U.S.C. 154(b) by 0 days.

(21) Appl. No.: 09/490,678

(22) Filed: Jan. 24, 2000

(51) Int. Cl.[7] .............................................. B29C 45/14
(52) U.S. Cl. ...................... 264/250; 264/255; 264/308; 264/328.8
(58) Field of Search ................................ 264/308, 250, 264/255, 328.8, 328.11, 294

(56) References Cited

U.S. PATENT DOCUMENTS

| 3,992,503 A | * 11/1976 | Henfrey et al. ............. 264/167 |
| 4,321,227 A | * 3/1982 | Henfrey et al. ............. 264/167 |
| 4,726,758 A | * 2/1988 | Sekine et al. ............. 264/328.8 |
| 4,946,639 A | * 8/1990 | Majerus et al. ............. 264/308 |
| 4,961,895 A | * 10/1990 | Klein ..................... 156/244.22 |
| 5,062,783 A | * 11/1991 | Majerus et al. ............. 425/115 |
| 5,514,310 A | * 5/1996 | Sander .................... 264/328.1 |
| 5,967,841 A | * 10/1999 | Bianca et al. ............... 439/590 |
| 6,085,950 A | * 7/2000 | Gouldson et al. ............. 223/85 |
| 6,146,199 A | * 11/2000 | Ortega et al. ............... 206/722 |

* cited by examiner

Primary Examiner—Jill L. Heitbrink

(57) ABSTRACT

A method of manufacturing traverse ribbed troughs of thermoplastic resin material comprises the following steps. A length of trough is injection molded in a mold cavity between male and female molds, the mold cavity being configured to form integral raised traversing ribs on the outer surface of the trough and a plurality of spaced extensions at an end. The injection molding is cooled to initiate setting of the resin/composition, the male and female molds are disengaged and a partially set resin/composition trough length is ejected. The male and female molds are re-engaged, with extension containing end of the formed trough participating in closing an open end of the mold cavity. Further resin/composition is injected into the cavity which forms a homogeneous continuum with the partially set extension containing end of the trough end which participated in closing, forming a continuing trough length, steps being repeated until the desired length of trough is formed.

25 Claims, 6 Drawing Sheets

METHOD FOR INJECTION MOLDING A TROUGH

The invention relates to the manufacture of continuous length troughs and more particularly to an improved drainage trough assembly and method of injection molding continuous length ribbed plastic drainage troughs of the type used in the handling of fluid run off in ground level applications.

BACKGROUND OF THE INVENTION

Drainage troughs, are in common use for collecting and distributing ground level run-off of fluids, such as storm water, waste fluid spills, and various cleaning and drainage applications. Generally such troughs are installed at or formed just below ground level in a paved area and the arrangement comprises a screen, grate or the like which covers the trough to enable vehicles, pedestrians and/or large objects to pass thereover without falling into the trough, while allowing fluids to pass through.

Pre-manufactured troughs have been generally available, formed from a rigid metal or plastic, typically by extruding or casting same to a desired length or various standard lengths. To protect against crushing, such troughs are generally sturdily manufactured and thus are difficult to cut into variations from standard lengths. In recent years, there has been a desire to manufacture and use extruded plastic troughs in place of metal troughs for both corrosion resistance and ease of handling, however the wall thickness required to produce a suitably crush resistant plastic trough is significant and thus material costs are expensive. To reduce costs, a plastic trough of lesser wall thickness has been proposed which is formed with a plurality of circumferential supporting ribs. The support ribs enable support of a weight supporting grate and provide suitable resistance against crushing the form of the trough, but the presence of the ribs generally are problematic to the convenient manufacture of the trough by extrusion. Thus, the manufacture of troughs by injection molding is not particularly desirable in that multiple distinct molds are generally necessary to enable the manufacture of the various standard sizes and lengths for general availability, and variations from such standards generally require the creation of additional expensive molds.

U.S. Pat. No. 3,992,503 discloses a method of manufacturing continuous ribbed pipes from thermoplastic materials, wherein a section of pipe is formed by injection molding, the section is allowed to set in the mold, the set pipe casting is ejected from the mold, an end of the set pipe casting is reset into an open end of the same mold, and further molten thermoplastic material is injected into the mold. The molten thermoplastic material engages against the end of the reset pipe casting, and is said to fuse with the thermoplastic material at the end of the reset pipe, with repetition of the operation resulting in the formation of a continuous molded pipe of welded sections. Provisions are made in the patent for a heating wire located at the open end of the mold to surround the reset end of the pipe and soften it to enable welding of the sections, and/or for the pipe to comprise a stepped diameter at the ends to facilitate softening of the thermoset resin to form a weld among the sections.

The disclosure of U.S. Pat. No. 3,992,503, makes it apparent that the final product being manufactured merely comprises a continuous length of thermoplastic pipe formed from a plurality of sections which have been welded together using conventional welding means, and thus having the inherent seam weakness of thermoplastic welds.

It is an object of the present invention to provide a method of manufacturing injection molded, continuous length troughs having suitable ribbed supports integral therewith.

It is a further object of the present invention to provide a method of injection mold manufacturing of troughs, which enables a homogeneous continuity of thermoplastic material throughout its length.

It is another object of the present invention to provide a novel injection mold formed drainage trough, having integrally molded raised ribs and support attachment elements.

It is still another object of the present invention to provide a novel drainage trough system enabled for rapid and convenient installation in diverse environments.

These and other objects of the invention will become apparent from the following recitation of the invention.

SUMMARY OF THE INVENTION

The present invention comprises a method of manufacturing a continuous length trough, comprising spaced, raised integral ribs, from thermoplastic resin material, comprising the steps of: (a) providing an injection mold cavity arranged between mating male and female molds, said cavity being shaped to form an elongate section of a trough having spaced, outwardly raised ribs, said cavity being open at a first end and closed at the opposite end, said opposite end of said cavity being configured to form a plurality of spaced extensions arranged along an end of a formed trough section; (b) providing means for removably covering the open first end of said mold cavity; (c) providing means for cooling a molten thermoplastic resin comprised in said cavity; (d) covering said first end of said mold cavity and injecting a molten thermoplastic resin, at an elevated temperature, into said cavity between said male and female molds; (e) cooling said molten thermoplastic resin to a pre-determined resin setting temperature; (f) uncovering said first end and removing a molded resin-set trough section from the female and male molds; (g) inserting the opposite end of said resin-set trough section, comprising the spaced extensions, into the open end of the mold cavity sufficient to close the open end of said mold cavity; (h) injecting molten thermoplastic resin into the mold cavity, at an elevated temperature sufficient to melt said spaced extensions of said first resin-set trough section and form a continuing section of trough, homogeneous with said first trough section; (i) cooling the molten thermoplastic resin to a pre-established setting temperature; (j) removing the molded second trough section from the female and male molds; and repeating steps (g) through (j) in successive order until a trough of a desired length is formed.

In a preferred embodiment, the elongate mold cavity in an injection molding process is formed by the confluence of three or more components. Thus, in a particularly preferred arrangement an elongate male mold, having an exterior surface configured to form the generally trough shaped configuration of an interior surface of a molded trough, is juxtaposed between two or more generally opposing female molds with the cooperative engagement of the three or more components forming the cavity to be injection filled, and the formed product is released from the mold cavity by disengagement of the three or more components. In a preferred operating arrangement between three components, a female mold is fixed in position and the male and another female mold are arranged to move toward and away from the female mold. Thus, in a preferred molding cycle, the female mold is arranged in a generally stable position, while a male and female molds are arranged in generally opposing relationship to the female mold and are enabled to be moved from a first position spaced from the stable female mold to a second position surrounding the male mold and defining the mold cavity. When moved to the second position, the female molds generally engage each other and the male mold, forming a sealed mold cavity surrounding about the length of the elongate male mold. The mold cavity is then injected with a suitable plastic composition; the injected plastic composition is allowed to cool to at least initiate setting thereof, with or without cooling assist; and upon the plastic composition reaching a suitable setting point, the male and movable female mold are withdrawn from the second position toward the first position.

Such arrangement of male and female molds enables the convenient formation of diverse integrally molded structures on the exterior surface of the molded trough, such as raised ribs and/or other protruding integral structural elements and the like, without the mold release problems associated with prior art arrangements.

In a preferred arrangement wherein two female molds engage the male mold from opposite legs of the generally trough shape, the generally opposite directional movement of the female molds away from the male mold toward the second position, provides an assist to release of the molded product from all three confluent molds. It has been found that moving the female molds in opposite directions away from the male mold, typically results in a loose molded product laying without problematic adherence on the male mold. It is believed that the initial incremental opposing movement of the female molds away from the male mold causes an initial flex to the molded product which breaks the surface adherence of the molded product to the male mold, and the resistance of the body of the molded product to further flex because of the engagement of opposite sides of the molded product against the structural trough shape of the male mold breaks the surface adherence of the molded product to the female molds. The result is the release of a molded product without the usual need for critical release agent parameters.

In addition to raised ribs, the exterior side walls of the trough may comprise integrally molded projecting tabs, surfaces, support configurations, bracket attachment elements and the like, which generally extend from the exterior sidewall of the trough to provide stabilizing, support and/or attachment elements for maintaining the integrity of the shape and positioning of the trough in its constructed installed environment.

In one embodiment, raised molded structures can be conveniently formed on the exterior surface of the trough to enable the convenient attachment of other support framework, structures, spacers and the like which may enable the leveling of the trough during installation and maintaining the trough in position during use. In a still further embodiment, the exterior surface of the trough of the invention comprises integrally molded slots, depressions, hollows and/or the like for convenient attachment of one or more support bracket(s) during installation, the support bracket(s) being configured to support the trough at a defined level from the supporting under-surface of a trench and the like to enable the pouring of concrete and the like around the trough to assure convenient integral installation of the trough along a finished formed floor and the like.

In a preferred embodiment of the mold cavity, the end of the mold cavity opposite the open end of the mold cavity comprises a primary rib cavity, configured to form a molded integral primary raised rib in the formed trough proximate the plurality of spaced extensions. Similarly, the mold cavity proximate the open end comprises a secondary rib cavity, configured to form a integral raised secondary rib in the formed trough, the configuration being sized and dimensioned to matingly engage the primary raised rib upon re-positioning. The location and configuration of the primary and secondary rib cavities is to enable repositioning of a released molded trough section in the mold cavity with the primary raised rib of the molded trough repositioned in the secondary rib cavity with the spaced extensions protruding inwardly of the mold cavity. Such configuration of a raised rib cavity in the general mold cavity proximate the open end of the mold, provides a convenient operational seal to resist resin leakage from the open end during manufacture of continuous length molded trough.

In general, the mold cavity may be configured with any desirable plurality of integral raised rib cavities along the length of the general mold cavity. In a particularly preferred embodiment, integral raised ribs are molded in closely spaced pairs. For example, the secondary rib cavity can comprise a pair of closely spaced rib cavities and the primary rib cavity a single rib cavity, such that upon repositioning and re-injection, the continuum of material can be positioned to occur along the trough at a rib and/or between two closely spaced ribs. In further example both the primary and secondary rib cavities can comprise closely spaced rib cavities or a single rib cavity and the continuum can be positioned to occur adjacent to the rib on the formed trough. In still further example closely spaced pairs of ribs may be comprised anywhere along the length of the trough, with the primary and secondary rib cavities arranged to form single rib embodiments.

The method of the invention enables the formation of closely spaced raised ribs flanking the seamless melding of resin material at the continuum of the molded trough and/or at standard measured lengths along the trough, providing a convenient end point(s) for cutting measured standard trough lengths and/or attaching convenient accessories. Thus, for example, the mold cavity can be configured to a standard length for example a one or two foot length, with repeating closely spaced ribs arranged at standard lengths, as for example 6 inch lengths, so that the trough can be conveniently formed at long lengths for storage and conveniently cut to convenient increments for use and/or custom length sale.

In a preferred configuration of the trough of the invention, the mold cavity is configured to provide pairs of closely spaced ribs arranged at standard measured increments along the length of the trough, and/or integrally molded snap receivers configured to receive and engage supporting elements, and/or integrally molded stabilizing tabs and the like. In one configuration, supporting elements are configured in the general trough shape and are arranged to insert into a slot formed by a pair of closely spaced ribs, gripping the trough and providing a secure pedestal for holding the trough at a desired height and placement within a trench. In another configuration, the trough may further contain integrally molded receivers and the like, configured to engage mating snap elements of a support member and the like which similarly engage the trough to provide a secure pedestal or the like for convenient installation.

The configuration and dimensioning of the spaced extensions arranged along the opposite end of the trough is critical to the formation of a homogeneous continuum of thermoplastic material in the process of the invention. Applicants have found that in the manufacture of troughs having a wall thickness in a non-ribbed portion of the trough of about $5/8'$ or less, extension configurations in the form of distinct spaced elongate fingers having generally parallel sides and a rounded tip is generally preferred, wherein the spacing between such formed fingers is generally dimensioned to be about the width of such formed finger, and the thickness of such finger is about half the wall thickness. Thus, wherein the non-ribbed wall thickness of the molded product is about ³⁄₁₆' a preferred finger is about ³⁄₁₆' wide, about ½' long and about ³⁄₃₂' thick, with the distance between fingers being about ³⁄₁₆'. In one embodiment one side of a finger is coplaner with one surface of the wall with the other side of the finger being offset from the opposite surface of the wall. In a preferred embodiment, both sides of the finger are offset from about the planes of both surfaces of the wall.

The arrangement of the fingers, together with the method of the invention enables a surprising continuum of material at the boundaries of a trough section, providing a homogeneity which does not appear to be achieved by conventional welding techniques of the prior art.

A primary use of molded troughs of the invention is as a terminus for fluid flow from a pitched surface and the like, the arrangement intended to drain fluids from a surface toward the trough and the trough intended to collect and/or redirect the flow of such fluids draining to it as may be desired.

In a preferred use, the installation of drainage troughs is generally performed integral with the construction of a contiguous surface such as a poured concrete and/or cement slab with the trough comprising a grate the installation being sufficient to support significant weight, for example a vehicle passing thereover. In such use of a plastic trough, it is generally critical that the trough be integrally supported through its length and be appropriately aligned and leveled in reference to the contiguous surfaces. Prior art methods of installation includes the use of support materials such as stone, sand, dirt and the like to generally align, level and support the trough during construction, with rods pins, wiring and the like being used to hold the trough in place during the pouring of concrete and the like materials. Such method of installation is time intensive, generally requiring two or more workers propping up the trough from a supporting under-surface to appropriate finished concrete level and alignment and thereafter carefully pouring surrounding concrete and the like to maintain the alignment of the trough through the formation and leveling of the surrounding surfaces. Additionally, in most installations it is generally desired to provide an appropriate outlet(s) from the trough and drainage pipes connecting the outlet(s) to a further location. The combination of rigging supporting arrangements for the trough, outlets and associated piping and maintaining the level of the rigged arrangement during pouring of a fluid concrete slurry or the like, as the trough tends to float upwardly, significantly increases the amount of adjustment, complexity and time required to complete the installation.

The trough and system of the present invention significantly reduces the problems and time associated with installation by providing conveniently pre-mountable base supported trough brackets, which are generally molded from the same material as the trough and are designed such that their support base rests on the supporting under-surface, to hold the trough and accompanying outlet(s) at a defined level spaced from the supporting under-surface to enable easy completion of piping and convenient under-surface preparation. Thus, preparing the site for positioning a trough system of the invention contiguous with a poured concrete and/or the like slab, merely requires preparing an appropriate under-surface beneath the trough on which the support brackets rest, which is adjacent to and/or contiguous with the suitably leveled under-surface on which the concrete slab and the like is to be poured. The spacing between the base of the brackets and the bottom of the trough is dimensioned to allow convenient attachment of appropriate piping to one or more outlets comprised in the trough. Though not generally required, the base of the brackets may be conveniently pinned and/or rodded to the under-surface, and/or stone, sand, dirt or the like may be placed on the base of the brackets to maintain the alignment of the trough in place during pouring of the concrete.

In a typical poured concrete installation, the brackets need not be pinned and/or rodded to the under-surface to maintain the trough in its leveled and/or aligned position. Instead, the bracket supported trough is arranged so that the base of the brackets rest on the under-surface, an amount of concrete or the like is initially poured on and around the base of the brackets, sufficient to steady the trough in level and/or alignment, and the mass of initial poured concrete surrounding the base end of the brackets is sufficient to maintain the trough from floating and/or moving as the level of poured concrete is raised to surround the exterior surface of the trough. Indeed, it is not unusual that the supporting under-surface is only roughly leveled and/or aligned for the trough such that initially the trough is only generally aligned and leveled and final critical alignment and leveling is not done until an initial level of concrete is poured which surrounds the base of the brackets, the final alignment of the trough being done by moving the brackets in the concrete slurry such that once aligned and leveled further concrete is added under the supported trough and evenly around the sides of the trough to the desired level of the contiguous surface. The covering of the base of the brackets by the concrete mass is generally sufficient to prevent the trough from floating.

Various thermoplastic materials may be used in the process of the invention, including resin compositions comprising a filler and/or reinforcing material. An important element to the method of the invention is the selection of a thermoplastic resin and/or resin composition that has a broad enough setting temperature range so that plasticity of the extension containing opposite end of the molded portion of trough is retained for a time sufficient to enable removal of the molded portion from the mold, reinsertion of the opposite end of the molded portion into the mold cavity and injection of thermoplastic resin into the mold cavity. Thus, the resin/composition at the opposite end of the trough has not reached a hardened set before the injection of further molten resin forming the continuum of the trough, but has retained plasticity.

Generally, a convenient means for determining the suitability of the setting temperature range of a resin/composition in the method of the invention is by observation of the amount of shrinkage the molded trough experiences as it cools from its molten state to its hardened state. As plasticity decreases during setting of the resin/composition, the molded product shrinks from a larger molten volume to a smaller solid. e.g. hardened, volume. Some degree of setting must occur before the product is removed from the mold to insure structural integrity of the trough section during handling. Ideally, the less shrink that occurs before the product can be removed, reinserted and resin/composition injected, the higher the probability of attaining a homogeneous continuum at the interface.

Generally, it has been found that the setting resin/composition product has undergone a sufficient reduction in structural plasticity to enable removal of the product from the mold, without compromising structural integrity, if the molded product has shrunk to about 5% of its anticipated shrinkage to a hardened state. Generally also, the process of the invention provides a continuum of homogeneous material at the interface of the opposite end and newly injected molten resin if the plasticity of the opposite end has not been so reduced that the product has shrunk more than about 90% of its anticipated shrinkage to a hardened state.

Thus, convenient determinations of the suitability of the setting temperature range of a resin/composition for use in the process of the invention, can be made by measuring the shrink time necessary for a molded product to go from about 5% of its total shrink to hardness, to 90% of its total shrink to hardness under the temperature conditions of the environment surrounding the opening of the mold, removal and reinsertion of the opposite end, closing of the mold and injection of new molten resin/composition. Comparison of this time to the processing time necessary to effectively do same, confirms the suitability or not of the resin/composition. Preferably, the processing time falls within about 5% of shrink or less to about 75% of shrink of the resin/composition, and more preferably within about 5% of shrink or less to about 50% of shrink of the resin/composition.

In a preferred embodiment of the invention, the thermoplastics material comprises a suitable polyvinyl, polystyrene or acrylate resin, such as a suitable polymerized olefin or a copolymer with styrene. Particularly preferred is polypropylene, most preferred being a generally non-filler comprising polypropylene.

By way of example, preferred embodiments of the invention will be described with reference to the accompanying drawings.

DETAILED DESCRIPTION OF THE DRAWINGS

Figure 1:
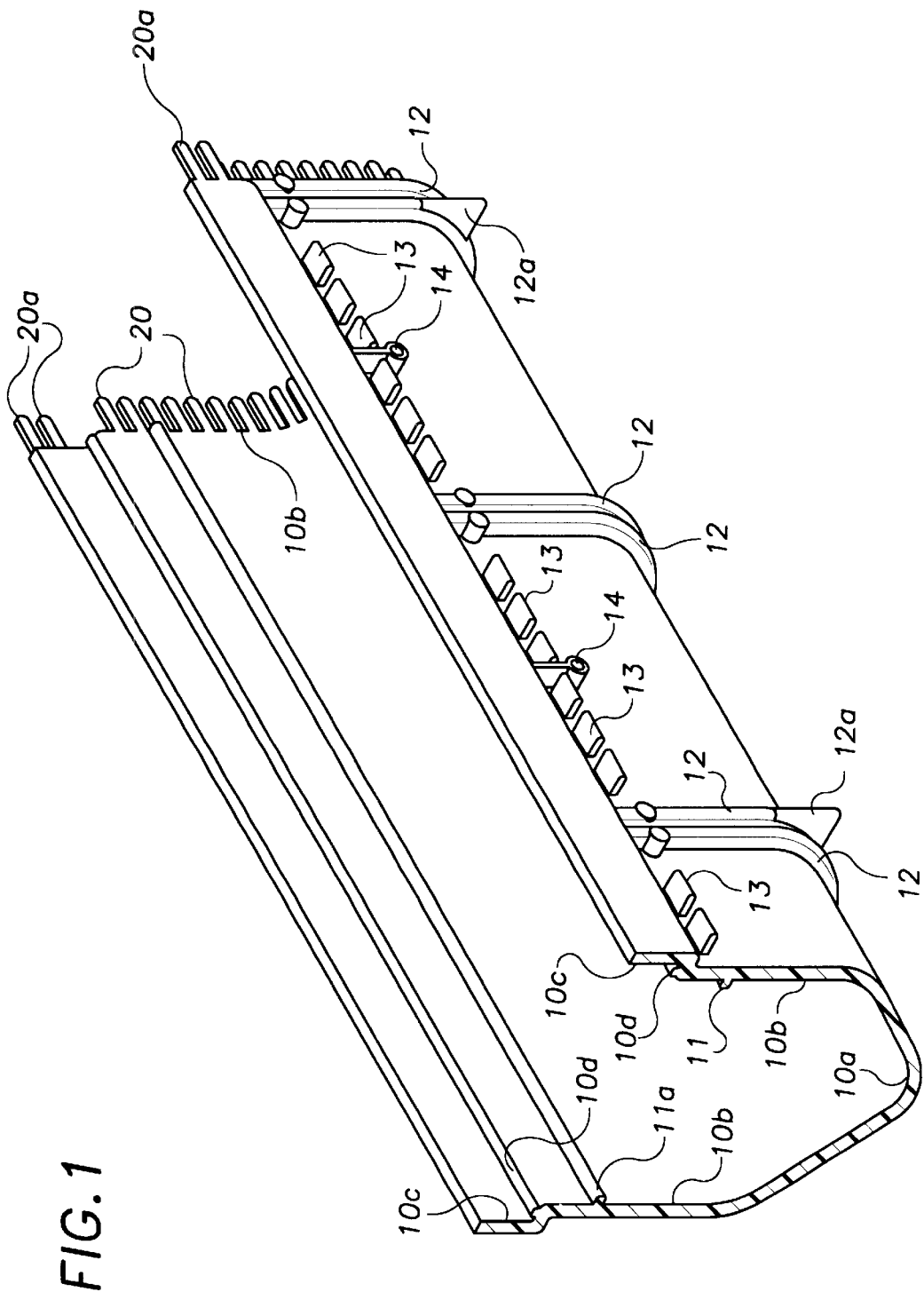
FIG. 1 is a perspective view of a molded trough section of the invention.

Referring first to FIG. 1, therein trough section 10, molded from thermoplastic synthetic resin material, is illustrated as an elongated member having a generally trough shaped cross sectional configuration comprising a plurality of integrally molded transverse ribs 12, formed along its outer surface to enhance its rigidity, and having a plurality of extensions 20, arranged at an end thereof.

In this particular preferred embodiment, base 10a of the trough shape is depicted as being somewhat angled, generally appearing "V" shaped, with generally parallel legs 10b extending therefrom to offset leg ends 10c. Ends 10c are offset, forming grate support shelf 10d, while optional longitudinal ribs 11 and 11a provide additional longitudinal stability to the trough and provide an attachment shoulder for a spring clip means(not shown), enabled to secure a grate to the trough. Integral transverse ribs 12 are illustrated in the preferred embodiment as arranged in closely spaced pairs. Each pair of transverse ribs is illustrated as spaced along the trough from an adjacent pair of ribs, preferably, spacing between pairs of ribs being a measured distance generally conforming to standard construction measurements and/or as may be necessary for maintaining rigidity for the utility of the trough. For example, it is generally convenient in standard trench construction to utilize measurements in even meter and/or ¼ meter lengths, thus dimensioning between centerlines of adjacent pairs of ribs is preferably ¼ meter. In certain heavy duty utilities, it may be desirable to have ribs placed every ⅛ meter. It should be understood however that such selection of dimensions between ribs can be greater or less than exemplified and though the ribs depicted in FIG. 1 are depicted as arranged in pairs, it should be understood that ribs can be single ribs along the length of the trough or any combination of single and/or paired or even several ribs arranged close together.

In FIG. 1, trough supports 12a are depicted as integrally comprised on a rib of every other pair of ribs. Such trough supports are optional elements of the trough of the invention, and are generally formed on both sides of the trough either on the same rib, adjacent rib of a pair or plurality of ribs, between pairs of ribs or the like. In a particularly preferred embodiment, trough supports are staggered between sides of the trough, providing convenient vertical support of the trough on an appropriate surface to enable convenient installation in a poured concrete or the like environment and additional surface area for the poured concrete to engage to resist release of the trough from its installed environment because of float, shrinking and/or expansion and the like during installation and/or cure of the concrete and/or the effects of temperature variations.

FIG. 1 further illustrates a plurality of stabilizer tabs 13, comprised along the length of both exterior sides of the trough section. The stabilizer tabs provide an optional additional horizontal surface area to engage the installation environment to resist release of the trough from its installed environment because of shrinking and/or expansion and the like during cure of the concrete and/or the effects of temperature variations. The particular arrangement of the stabilizer tabs proximate the offset of the legs of the depicted trough provides a significant advantage in that in the event the trough of the invention must be removed from an installed, cured poured concrete environment, the offset ends of the legs can be collapsed toward each other to release the tabs from the concrete leaving a molded concrete form generally conforming to the exterior surface of the trough of the invention. The removed trough or a new mating trough can be conveniently re-installed in the molded concrete generally by gently tapping the trough back into its original position with or without the application of minimal heat to the thermoplastic trough to assure a tight mating fit.

Figure 7:
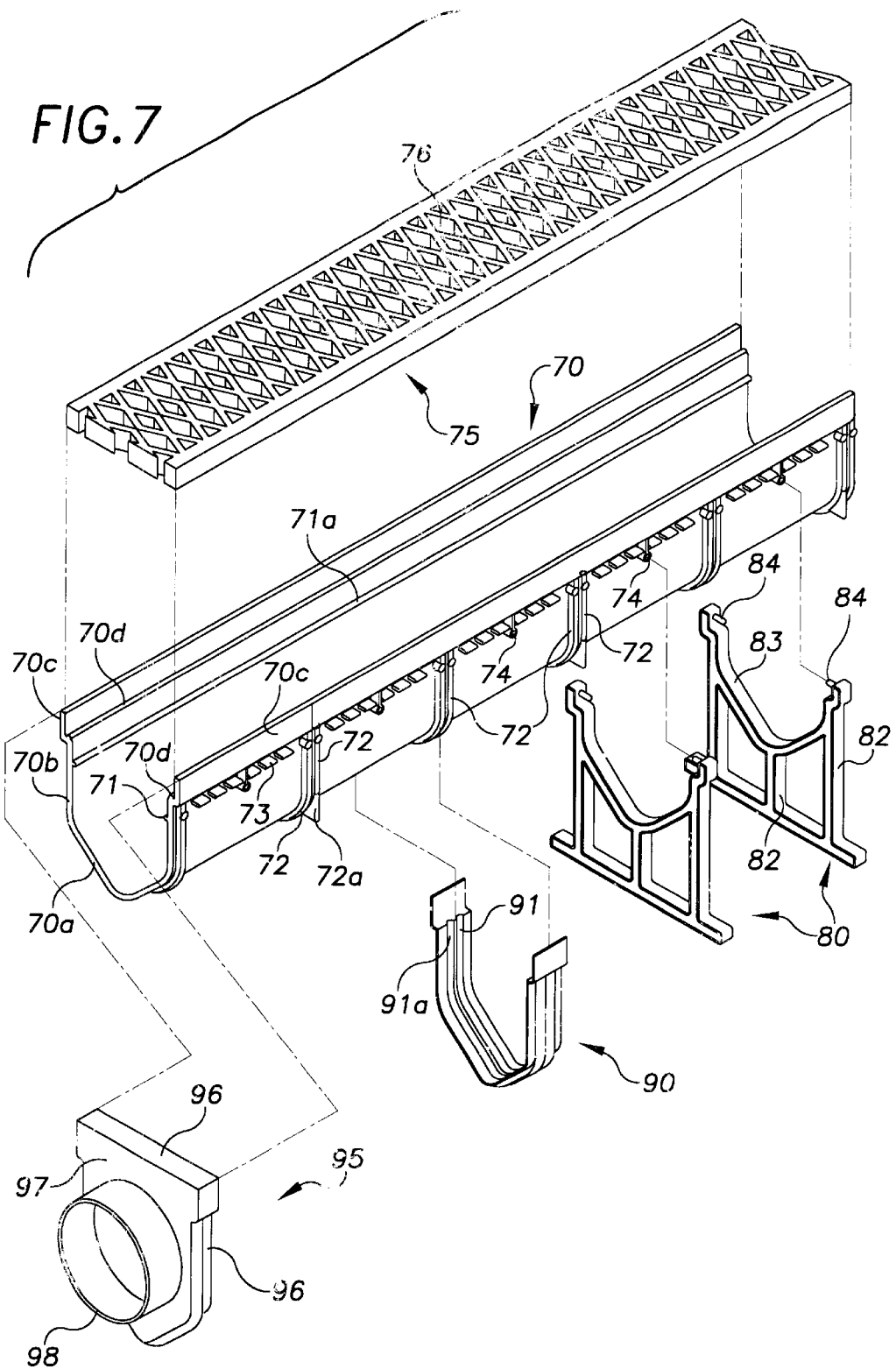
FIG. 7 is a perspective view of a molded trough system of the invention.

Bracket attachment holes 14 are optionally provided at spaced intervals along opposite sides of the illustrated trough of FIG. 1. FIG. 7, illustrates a particular embodiment of brackets contemplated for attachment to the trough of FIG. 1, the brackets comprising attachment studs 84 which are arranged to matingly engage bracket stud receivers in the trough for attachment of the brackets thereto for support of the trough. The use of brackets to support the trough is particularly contemplated in installations wherein there is a difference in depth between the trough and the depth of a poured floor environment surrounding it. Thus for example, brackets might be used when the poured floor environment is significantly deeper than the trough to be installed and the brackets can be fixed to an undersurface for perfect alignment of the trough prior to pouring the floor environment surrounding the trough to stabilize it from float.

The illustrated trough sections of FIGS. 1, 1a, 2 and 2a, depict a plurality of integrally molded, spaced apart elements identified as extensions, which are comprised on the end of a trough section in an arrangement enabling the formation of an infinite length trough by the method of the invention.

Figure 1A:
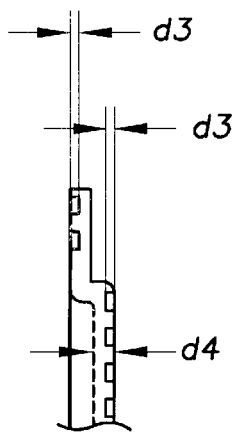
FIG. 1a is a partial sectional end view of a spaced extension containing end of a molded trough section of FIG. 1.
Figure 2A:
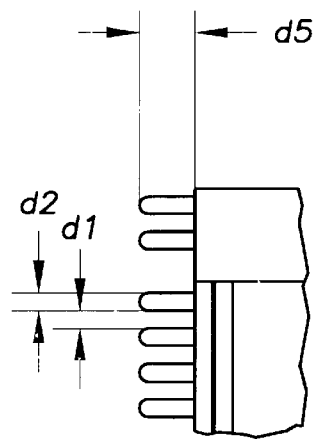
FIG. 2a is a partial sectional side view of a spaced extension containing end of a molded trough section of the invention.

FIG. 1, illustrates trough 10 as comprising a plurality of integrally molded, spaced apart extensions 20 and 20a. Extensions 20 are arranged along generally parallel legs 10b and are depicted as having an inside surface generally flush with the inside surface of the trough; while extensions 20a are depicted as arranged along the offset ends 10c of the legs 10b, and have an exterior surface generally flush with the exterior surface of leg ends of the trough. FIG. 1a is an end view of the extensions of FIG. 1.

Figure 2:
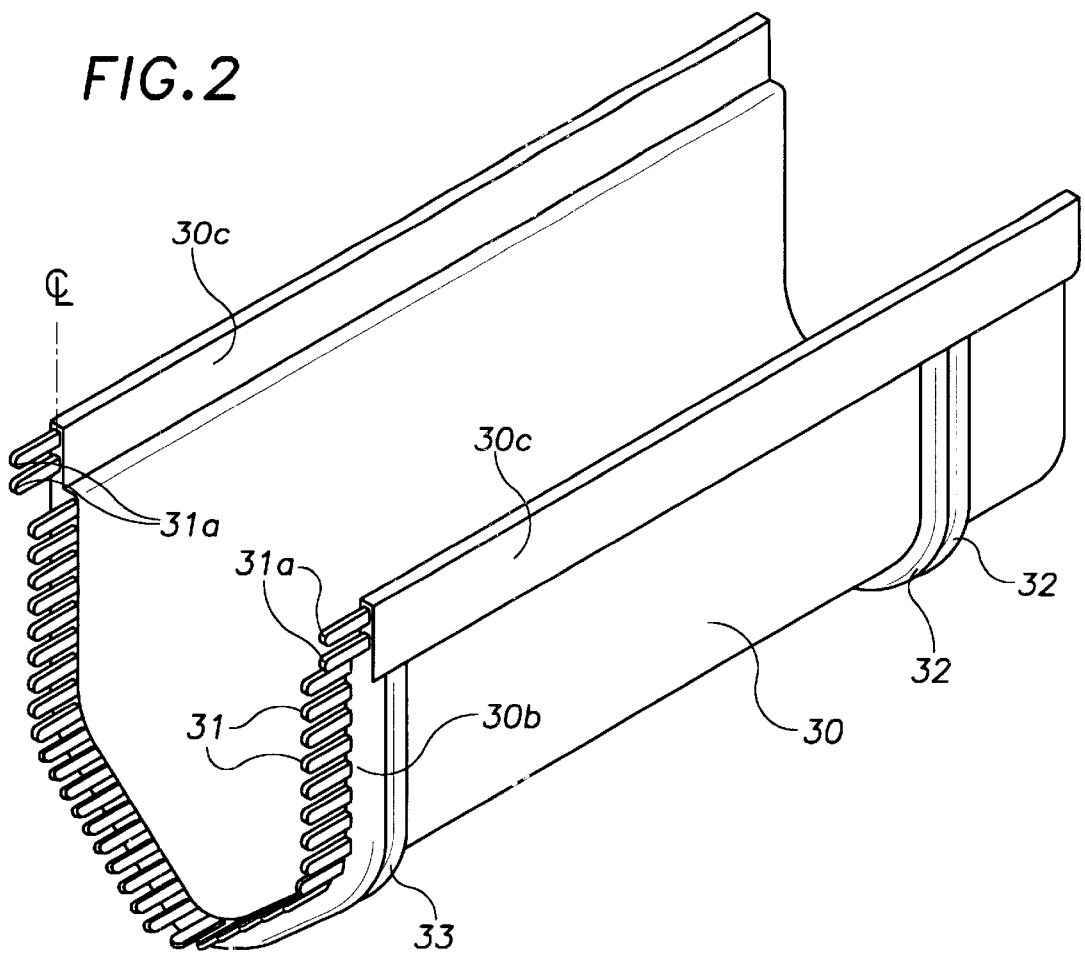
FIG. 2 is a perspective view of another embodiment of a molded trough section of the invention.

FIG. 2, illustrates an embodiment of the invention wherein trough 30 comprises integral transverse ribs arranged as a closely spaced pair of ribs 32, having a single rib 33 spaced therefrom, repeating throughout the length of the trough. Extensions 31 and is 31a, are illustrated as being a plurality of integrally molded, spaced apart elements extending from the end of trough 30, with extensions 31 arranged along generally parallel legs 30b being depicted as having both inside surfaces generally offset from both the inside and outside surfaces of the trough; and extensions 31a being depicted as having both inside and outside surfaces generally offset from the inside and outside surfaces of leg ends 30c of trough 30. FIG. 2b is a side view of the extensions of FIG. 2.

In the illustrated embodiments of FIGS. 1, 1a, 2 and 2a, the extensions are shown in a preferred form of a generally rectilinear member appearing as distinct spaced elongate fingers having generally parallel sides, wherein the thickness $d_3$ of a finger is preferably about one half of the wall thickness $d_4$ of the trough, the spacing $d_1$ between fingers is preferably dimensioned to be about the width $d_2$ of the formed finger, and the length of the fingers $d_5$ is preferably about three times the width of a finger. It should be understood that though dimensioning of the fingers appears to be generally critical to the formation of a homogeneous continuum of thermoplastic material in the process of the invention, the key criticality appears to be thickness of the fingers and the general limitations within such criticality appear to be significantly effected by the wall thickness of the non-ribbed portion of the trough. Thus, the critical thickness $d_3$ of a finger is generally in the range of about one third to about two thirds of the wall thickness $d_4$ of the trough. The critical finger width $d_2$ and spacing between fingers $d_1$ is generally from about one to about three times the critical thickness $d_3$ of a finger, while the critical length $d_5$ of a finger is generally a minimum length of at least about twice the thickness $d_3$ of a finger, with the maximum length being about ten times such thickness.

FIGS. 3, 4, 5 and 6 illustrate a mold assembly particularly suitable for forming the infinite length molded trough of the invention in accord with the process of the invention.

Figure 3:
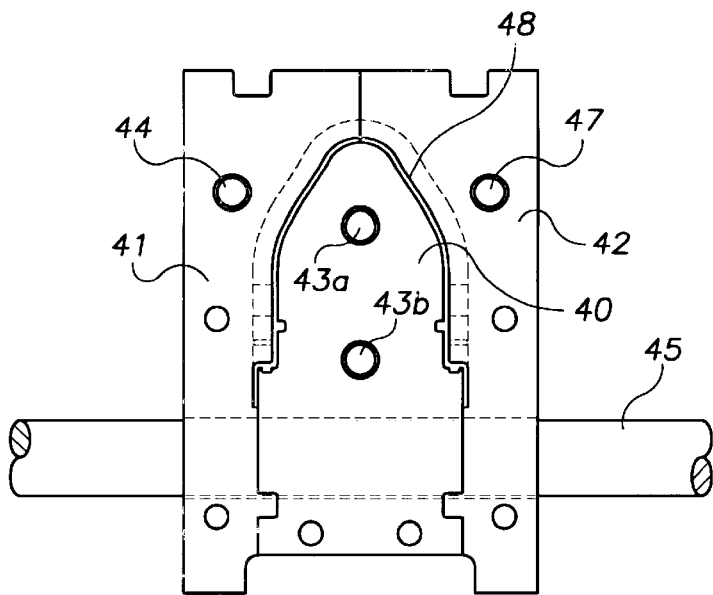
FIG. 3 is an front view of a trough mold assembly of the invention wherein the components are in a closed position.
Figure 4:
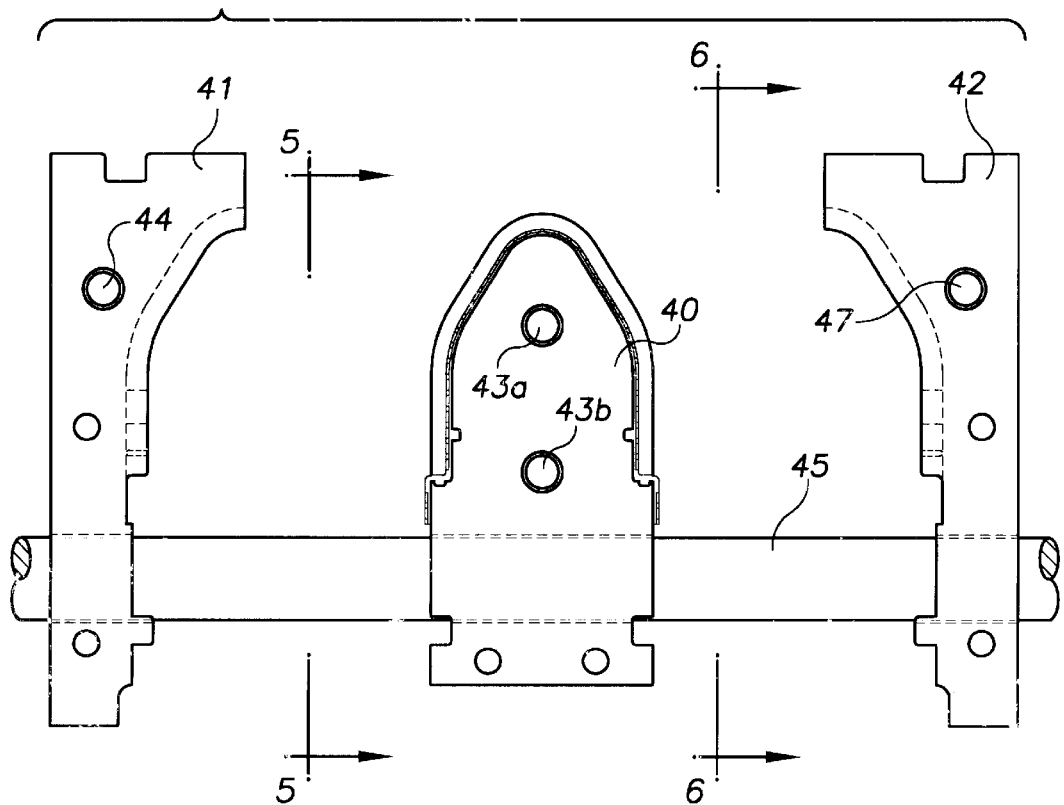
FIG. 4 is an front view of the trough mold assembly of FIG. 3 wherein the components are in an open position.

Referring first to FIGS. 3 and 4, which depict the front surfaces of the mold assembly illustrating the relative arrangement of molds in a closed cavity filling position and open cavity release position respectively. Therein, male mold element 40 is flanked by opposing female mold elements 41 and 42, in an operating arrangement wherein female mold element 41 is mounted to a fixed platen(not shown), male mold element 40 is mounted in what is commonly termed a floating mold arrangement, while opposing female mold element 42 is mounted to a moveable platen(not shown). In the illustrated arrangement, female mold element 42 and male mold element 40 are moved generally horizontally toward fixed position female mold element 41 to form the mold cavity having opening 48 and are withdrawn from female mold element 41 and each other to disengage to an release position for release of the molded product as illustrated in FIG. 4. Two mounting bars 45 and 46 (not shown) support male mold element 40 and female mold element 42 in aligned arrangement to enable sliding movement of male mold element 40 and female mold element 42 into engaging and disengaging position with each other and fixed female mold element 41. Floating mold arrangements as used in the process of the invention, and apparatus suitable therefore, are commonly known and available in the molding industry.

One or more mold elements of a floating mold arrangement as above illustrated, preferably comprise internal passageways to enable cooling of the mold elements to expedite the process of the invention. In the illustrated embodiment, each of the mold elements comprises an interior passageway (not shown) which enables the flow of a cooling fluid through the mold element, with inlet 44 and 47 illustrating inlets for fluid to the interior passageways of female mold elements 41 and 42 respectively, both having outlets from their respective passageways on a rear surface (not shown). Inlet 43a and outlet 43b on front surface 40a of male mold element 40 illustrate both the inlet and outlet to an internal passageway for circulating a fluid coolant.

Figure 5:
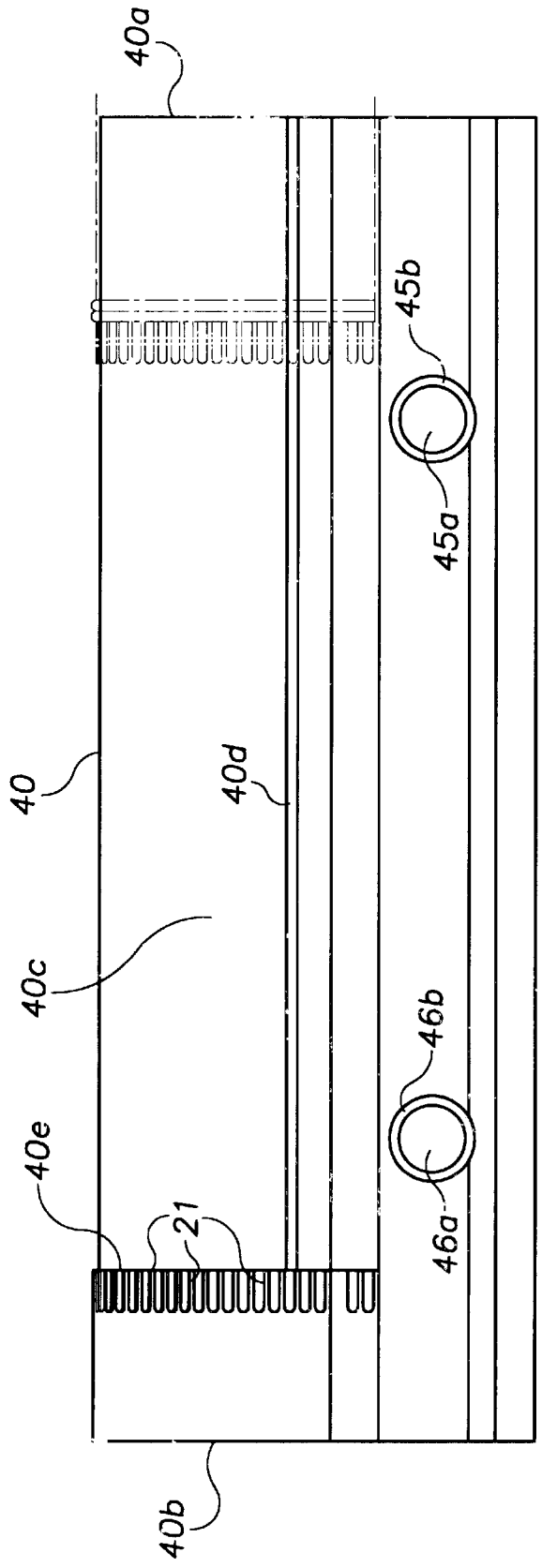
FIG. 5 is a side view of the male component of the mold assembly of FIG. 4, taken along about line 5—5'.

FIG. 5, comprises a side view of male mold element 40, with end 40b comprising the rear closed end and end 40a comprising the front open end, and illustrating the configuration of the interior surface of the mold cavity, being the interior surface of the trough. Therein, hole 45a comprising bushing 45b and hole 46a comprising bushing 46b are illustrated as extending through the male mold element and being sized and dimensioned to sliding engage mounting bars 45 and 46 (not shown) respectively, supporting the male mold element in a slidable, floating arrangement. In this embodiment, the male mold element comprises a generally non-obstructing base and leg surface 40c to enable a generally non-obstructing flow of collected fluid along the trough and slot 40d is illustrated, which forms the mold cavity for a longitudinal rib. A plurality of finger slots 21 are illustrated which form the mold cavity for the plurality of fingers 20 comprising the molded trough beginning along edge 40e. Rear end 40b of the male mold element is the closed end of the mold cavity in accord with the process of the invention, with the sealing of injected plastic from between the female and male molds occurring at about the terminus of finger slots 21. Front end 40a of the male mold is the open end of the mold cavity in accord with the process of the invention, with the sealing of injected plastic between the female and male molds being enabled by the retention of a molded finger comprising end of a prior formed trough section in the cavity spaced from end 40a, as illustrated in phantom.

Figure 6:
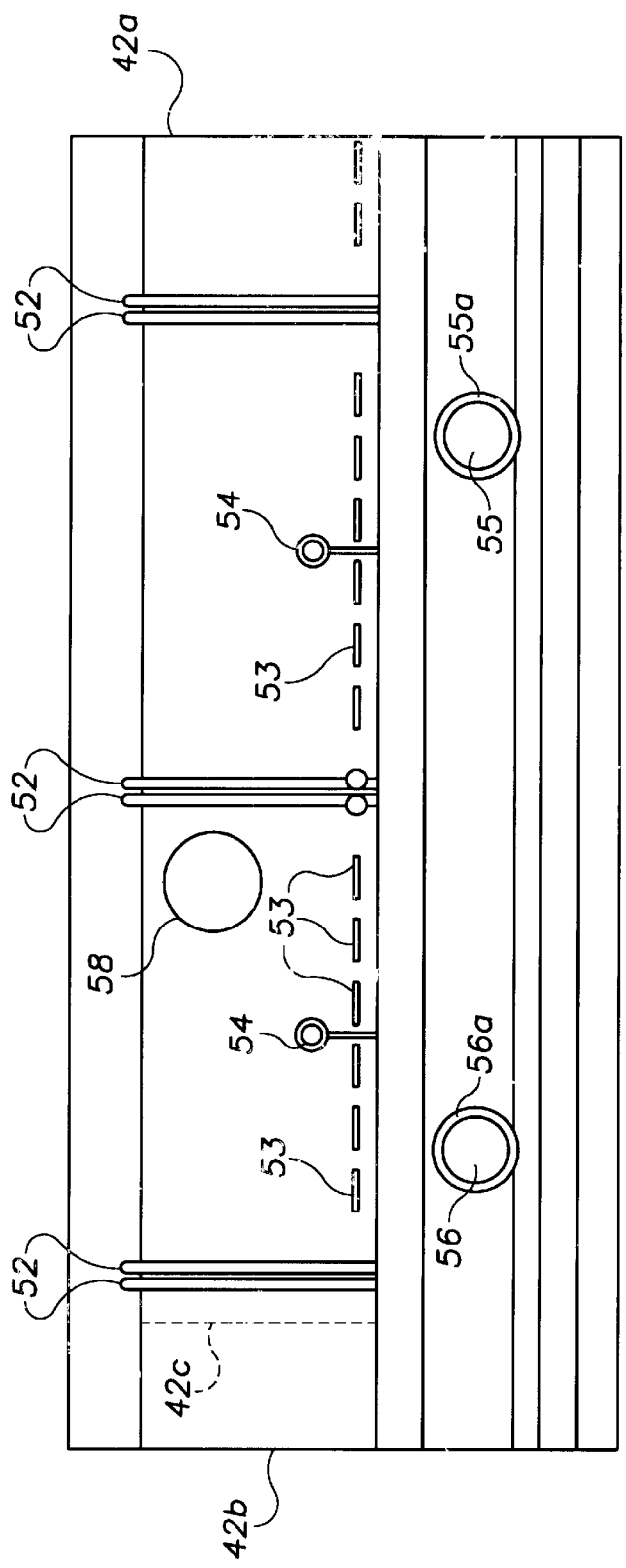
FIG. 6 is a side view of a female component of the mold assembly of FIG. 4, taken along about line 6—6'.

FIG. 6, comprises an inside view of female mold element 42, with end 42b comprising the rear closed end of the mold cavity and end 42a comprising the front open end of the mold cavity, and illustrating the configuration of the interior surface of the mold cavity, being the exterior surface of the trough. Therein, hole 55 comprising bushing 55a and hole 56 comprising bushing 56a are illustrated as extending into female mold element 42 and being sized and dimensioned to slidingly engage mounting bars 45 and 46 (not shown) respectively, aligning the female mold element with the male mold element in a slidable arrangement.

In this embodiment, the female mold element comprises the multiplicity of slot configurations forming the ribs, tabs and bracket attachment slots contained on the exterior surface of the molded trough. Thus, slots 52 illustrated in the interior wall of element 42 comprise that portion of the mold cavity in which the ribs 12 of the trough are formed, slots 53 illustrated in the interior wall of element 42, comprise that portion of the mold cavity in which stabilizer tabs 13 are formed, and circular tipped slots 54, that portion of the mold cavity which form the bracket stud receivers. Opening 58, is in fluid connection with the source of plastic to be injected and illustrates the inlet port through which plastic is injected into the cavity for formation of the trough. Phantom line 42c illustrates the point about which female mold element 42 aligns with edge 40e of the male member, the sealing of the closed end of the mold cavity being the engagement of mating surfaces of the female mold elements with the male mold element, beginning at about where the extensions on the trough start and extending to the rear closed ends of the mold elements.

Female mold element 41 is essentially a mirror image of female mold element 42, except that in the present embodiment does not comprise a port for injection of plastic. It should be understood one or more injection ports can be located at any convenient place in the mold cavity and can be sources through any of the male and/or female mold elements forming the cavity.

Referring now to FIG. 7, wherein is illustrated a trough system of the invention, comprising an infinite length trough 70, molded from thermoplastic synthetic resin material by the process of the invention, the base 70a of the trough having generally parallel legs 70b extending therefrom to offset leg ends 70c and having opposing interior grate support shelves 70d and opposing longitudinal ribs 71 and 71a configured for attachment of a spring clip means enabled to secure grate 75 to the trough. Each exterior side of the trough comprising a plurality of integrally molded transverse ribs 72 with trough supports 72a illustrated as integrally comprised on a rib of every other pair of ribs, and having a plurality of stabilizer tabs 73 illustrated as spaced along the length of both exterior sides of the trough section and bracket attachment holes 74 illustrated as spaced between each pair of transverse ribs 72.

Grate 75 is illustrated as preferably being formed from plastic, the grate comprising a diamond configuration 76 and being sized to be supported between offset leg ends 70c by grate support shelves 70d. Generally grate 75 is manufactured in standard lengths wherein a plurality of grates are arranged along an infinite length trough, and the mass of the grate is significantly greater than the mass of the side walls of the trough. It should be understood that though the illustrated grate is formed from plastic, any suitable material such as metal and the like may be used.

Brackets 80 are illustrated as preferably being formed from a filled thermoplastic resin, comprising base 81, support frame 82, trough support surface 83 and attachment studs 84. Trough support surface 83 is configured to generally conform to the exterior surface of the trough bracket with attachment studs 84 engaging attachment holes 74. The placement of brackets along the trough can be between each illustrated pair of ribs or any interval appropriate for the installation. Again, it should be understood that though the illustrated brackets are formed from plastic, any suitable material such as metal and the like may be used.

Trough joiner 90 is illustrated as preferably being formed from a thermoplastic resin material and being configured to generally conform to the exterior surface of the trough, and comprising rib slots 91 and 91a, sized and dimensioned to generally overlay a paired set of transverse ribs. The trough joiner is configured to join trough sections in a utility wherein an infinite length trough may not be available and/or suitable for an extreme length installation and/or as otherwise necessary. The illustrated trough joiner is specifically useful for utilities wherein joining occurs at a rib and/or pair of ribs, but it should be understood that it is contemplated that such joiner includes configurations without rib slots for joining sections of trough between ribs and that the joiner can be manufactured from any suitable material which will generally which can be adhered by an adhesive, glue or the like to each section of trough as may be suitable for the installation.

End cap 95 is also illustrated, generally comprising a surround lip 96, which is configured to surround the exterior surface of an end of the trough and be glued or otherwise connected to the end of the trough, and a face plate 97. In the illustrated embodiment, end cap 95 comprises a tubular member 98 arranged on face plate 97, which extends from the exterior side of the installed end cap, such that the installer has the option of cutting an opening through the face plate to enable the flow of fluid through the tubular member, from or to the trough.

I claim:

1. A method of manufacturing a continuous length trough, having integrally molded raised ribs, comprising the steps of:

(a) providing male and female molds arranged to form a mold cavity therebetween when in mating engagement and enable release of a molded trough formed in said cavity when disengaged, said cavity being shaped to form an elongate section of trough having raised ribs, and being open at a first end and closed at an opposite end when in mating engagement, said opposite end of said cavity being configured to form a plurality of spaced extensions arranged along the corresponding opposite end of a trough section molded therein;

(b) providing means for cooling a molten thermoplastic resin comprised in said injection mold cavity;

(c) matingly engaging said male and female molds and injecting a molten thermoplastic resin, at an elevated temperature, into said mold cavity;

(d) cooling the injected molten thermoplastic resin to a pre-determined resin setting temperature;

(e) disengaging said male and female molds and releasing a molded resin set trough section therefrom having a plurality of spaced extensions formed along its opposite end;

(f) inserting the end of said resin set molded trough section comprising the spaced extensions, into the open end of the mold cavity, arranged so as to close the open end of said mold cavity when said male and female molds are engaged;

(g) matingly engaging said male and female molds and injecting molten thermoplastic resin into the mold cavity, at an elevated temperature sufficient to melt said resin set spaced extensions of the molded trough section of (f) and form a molded trough section in homogeneous continuum with said molded trough section of (f), having a plurality of spaced extensions formed at the corresponding end;

(h) cooling the injected molten thermoplastic resin of (g) to a pre-established setting temperature;

(j) disengaging said male and female molds and releasing said continuum molded resin set trough section therefrom having a plurality of spaced extensions formed at the corresponding end; and repeating steps (f) through (j) in successive order until a trough of a desired length is formed.

2. A method of claim 1 wherein a molded trough is automatically released from said male and female mold elements, automatically retracted to said open end of said mold cavity and automatically positioned between the male and female mold elements in the open end of the mold cavity, arranged to close the open end of said mold cavity when the male and female molds are matingly engaged.

3. A method of claim 1 wherein the female mold elements are shaped to provide a plurality of spaced raised ribs on the outer surface of the trough.

4. A method of claim 1 wherein the opposite end of the mold cavity is configured to form a raised rib proximate the plurality of spaced extensions comprised at its end.

5. A method of claim 4 wherein the raised rib proximate the plurality of spaced extensions comprises a shoulder which is configured to engage about the open end of the mold cavity during injection of resin.

6. A method of claim 4 wherein the mold cavity is configured to form raised ribs proximate both ends of the mold cavity.

7. A method of claim 1 wherein said mold cavity is configured to form a pair of closely spaced integral raised ribs.

8. A method of claim 1 wherein said extensions are configured in the form of distinct spaced elongate fingers having generally parallel sides.

9. A method of claim 8 wherein a finger is from about one third to about two thirds of the average non-ribbed wall thickness the trough.

10. A method of claim 9 wherein the thickness of finger is about half the wall thickness of said trough.

11. A method of claim 8 wherein the space between fingers is from about one to about three times the thickness of a finger.

12. A method of claim 11 wherein the spacing between fingers is about the width of a finger.

13. A method of claim 8 wherein the length of a finger is from about two to about ten times the thickness of a finger.

14. A method of claim 9 wherein the average non-ribbed wall thickness of the trough is from about 5/32 inch to about 7/32 inch, a finger is from about 5/32 inch to about 7/32 inch wide, from about 3/8 inch to about 5/8 inch long, and from about 5/64 inch to about 7/64 inch thick, and a finger is spaced from about 5/32 inch to about 7/32 inch from an adjacent finger.

15. A method of claim 10 wherein the average non-ribbed wall thickness of the trough is about 3/16 inch, a finger is about 3/16 inch wide, about 1/2 inch long and about 3/32 inch thick, and the distance between fingers is about 3/16 inch.

16. A method of claim 14 wherein one side of a finger is coplaner with a surface of the wall, and the opposite side of the finger is offset from the opposite surface of the wall.

17. A method of claim 1 wherein the plastics material contains at least one of filler and reinforcing material.

18. A method of claim 1 wherein the thermoplastic material is polypropylene.

19. A method of claim 1 wherein two female molds and a male mold are arranged to form an injection mold cavity therebetween when in an engaged position.

20. A method of claim 19 wherein the two female molds are arranged to engage and disengage the male mold from generally opposite sides of the male mold.

21. A method of claim 20 wherein the female molds move toward each other to engage the male mold.

22. A method of claim 20 wherein the male mold and a female mold move toward and away from a generally fixed position second female mold, to engage and disengage.

23. A method of claim 20 wherein the male mold and female molds are arranged to slide along a common plane to engage and disengage.

24. A method of claim 1 wherein the predetermined resin setting temperature that the injected molten thermoplastic resin is cooled, is that temperature of the molded trough resin composition wherein the formed trough has shrunk from about 5 to about 90 percent of its total shrinkage from a molten thermoplastic resin to a hardened state.

25. A method of claim 24 wherein said formed trough has shrunk from about 5 to about 75 percent of its total shrinkage to a hardened state.

* * * * *